(12) United States Patent
Ulmer et al.

(10) Patent No.: US 7,970,976 B2
(45) Date of Patent: Jun. 28, 2011

(54) REMOTE MEMORY ACCESS USING REVERSIBLE HOST/CLIENT INTERFACE

(75) Inventors: Elisha Ulmer, Tiberias, IL (US); John Hillan, Alton (GB)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 12/395,673

(22) Filed: Mar. 1, 2009

(65) Prior Publication Data

US 2010/0223415 A1 Sep. 2, 2010

(51) Int. Cl.
*G06F 13/14* (2006.01)

(52) U.S. Cl. ........ 710/305; 710/106; 710/110; 710/308; 710/313

(58) Field of Classification Search ................ 710/106, 710/110, 305, 308, 313, 317, 115, 117
See application file for complete search history.

(56) References Cited

U.S. PATENT DOCUMENTS

| | | | | |
|---|---|---|---|---|
| 5,146,607 A * | 9/1992 | Sood et al. | ...................... | 711/211 |
| 5,303,362 A * | 4/1994 | Butts et al. | ...................... | 711/121 |
| 5,784,581 A * | 7/1998 | Hannah | ........................ | 710/110 |
| 6,098,120 A * | 8/2000 | Yaotani | ............................ | 710/16 |
| 6,295,585 B1 * | 9/2001 | Gillett et al. | ................... | 711/148 |
| 6,308,239 B1 * | 10/2001 | Osakada et al. | .............. | 710/316 |
| 6,418,494 B1 * | 7/2002 | Shatas et al. | ..................... | 710/305 |
| 6,487,643 B1 * | 11/2002 | Khare et al. | ...................... | 711/150 |
| 6,600,739 B1 * | 7/2003 | Evans et al. | ..................... | 370/362 |
| 6,826,619 B1 * | 11/2004 | Khare et al. | ................... | 709/232 |
| 6,862,640 B2 * | 3/2005 | Smith | ........................... | 710/240 |
| 6,907,492 B2 * | 6/2005 | Matsuda et al. | .............. | 710/313 |
| 6,917,967 B2 * | 7/2005 | Wu et al. | ........................ | 709/213 |
| 6,996,636 B2 * | 2/2006 | Hung et al. | ....................... | 710/8 |
| 7,024,504 B2 * | 4/2006 | Saito et al. | ..................... | 710/110 |
| 7,085,876 B2 * | 8/2006 | Lai et al. | ....................... | 710/313 |
| 7,114,030 B2 * | 9/2006 | Teicher et al. | ................. | 711/115 |
| 7,185,132 B2 * | 2/2007 | Tang | ............................. | 710/305 |
| 7,197,583 B2 * | 3/2007 | Takinosawa et al. | ........... | 710/62 |
| 7,225,357 B2 * | 5/2007 | Tai et al. | ......................... | 714/25 |
| 7,234,029 B2 * | 6/2007 | Khare et al. | .................... | 711/146 |
| 7,266,587 B2 * | 9/2007 | Rowlands | ...................... | 709/214 |
| 7,266,625 B2 * | 9/2007 | Sakaki et al. | .................. | 710/104 |
| 7,269,669 B2 * | 9/2007 | Liu et al. | ............................ | 710/8 |
| 7,293,118 B1 * | 11/2007 | Wright | ............................ | 710/15 |
| 7,298,416 B2 * | 11/2007 | Uryu | .............................. | 348/372 |
| 7,383,362 B2 | 6/2008 | Yu et al. | | |
| 7,412,621 B2 * | 8/2008 | Choi | .................................. | 714/10 |
| 7,413,129 B2 * | 8/2008 | Fruhauf | ........................ | 235/492 |
| 7,424,561 B2 * | 9/2008 | Sano et al. | ..................... | 710/105 |
| 7,478,191 B2 * | 1/2009 | Wurzburg et al. | ............ | 710/316 |
| 7,480,753 B2 * | 1/2009 | Bohm et al. | ..................... | 710/104 |
| 7,484,020 B2 * | 1/2009 | Takinosawa et al. | ........... | 710/62 |
| 7,484,031 B2 * | 1/2009 | Tjia | ................................ | 710/313 |
| 7,502,878 B1 * | 3/2009 | Wright | ............................ | 710/37 |

(Continued)

OTHER PUBLICATIONS

Intel Corporation. Universal Host Controller Interface (UHCI) Design Guide. Revision 1.1. Mar. 1996.*

(Continued)

*Primary Examiner* — Matthew D Spittle
(74) *Attorney, Agent, or Firm* — Stanton Braden

(57) ABSTRACT

Accessing memory on a first device from a second device is supported by reversible host/client interfacing between the devices. The reversible interfacing permits the first and second devices to be configured respectively as host and client, or respectively as client and host.

15 Claims, 5 Drawing Sheets

U.S. PATENT DOCUMENTS

| | | | |
|---|---|---|---|
| 7,587,544 B2 * | 9/2009 | Tang et al. | 710/260 |
| 7,640,385 B2 * | 12/2009 | Ng et al. | 710/300 |
| 7,664,899 B2 * | 2/2010 | Kimura | 710/106 |
| 7,890,683 B2 * | 2/2011 | Kimura | 710/106 |
| 2003/0030412 A1 * | 2/2003 | Matsuda et al. | 320/127 |
| 2004/0153597 A1 * | 8/2004 | Kanai et al. | 710/305 |
| 2004/0225836 A1 * | 11/2004 | Lin | 711/115 |
| 2005/0066106 A1 * | 3/2005 | Lee | 710/316 |
| 2005/0204072 A1 | 9/2005 | Nakagawa | |
| 2006/0047982 A1 * | 3/2006 | Lo et al. | 713/300 |
| 2006/0095642 A1 * | 5/2006 | Hesse et al. | 710/313 |
| 2007/0239919 A1 * | 10/2007 | Kanai et al. | 710/305 |
| 2007/0299929 A1 * | 12/2007 | Nielsen | 709/217 |
| 2009/0177816 A1 * | 7/2009 | Marx et al. | 710/72 |

OTHER PUBLICATIONS

NXP. USB On-The-Go. A tutorial. Jul. 2007.*

Hyde, John. USB Multi-Role Device Design by Example. Cypress Semiconductor. 2003.*

International Search Report and Written Opinion—PCT/US2010/025450, International Search Authority—European Patent Office—Apr. 28, 2010.

* cited by examiner

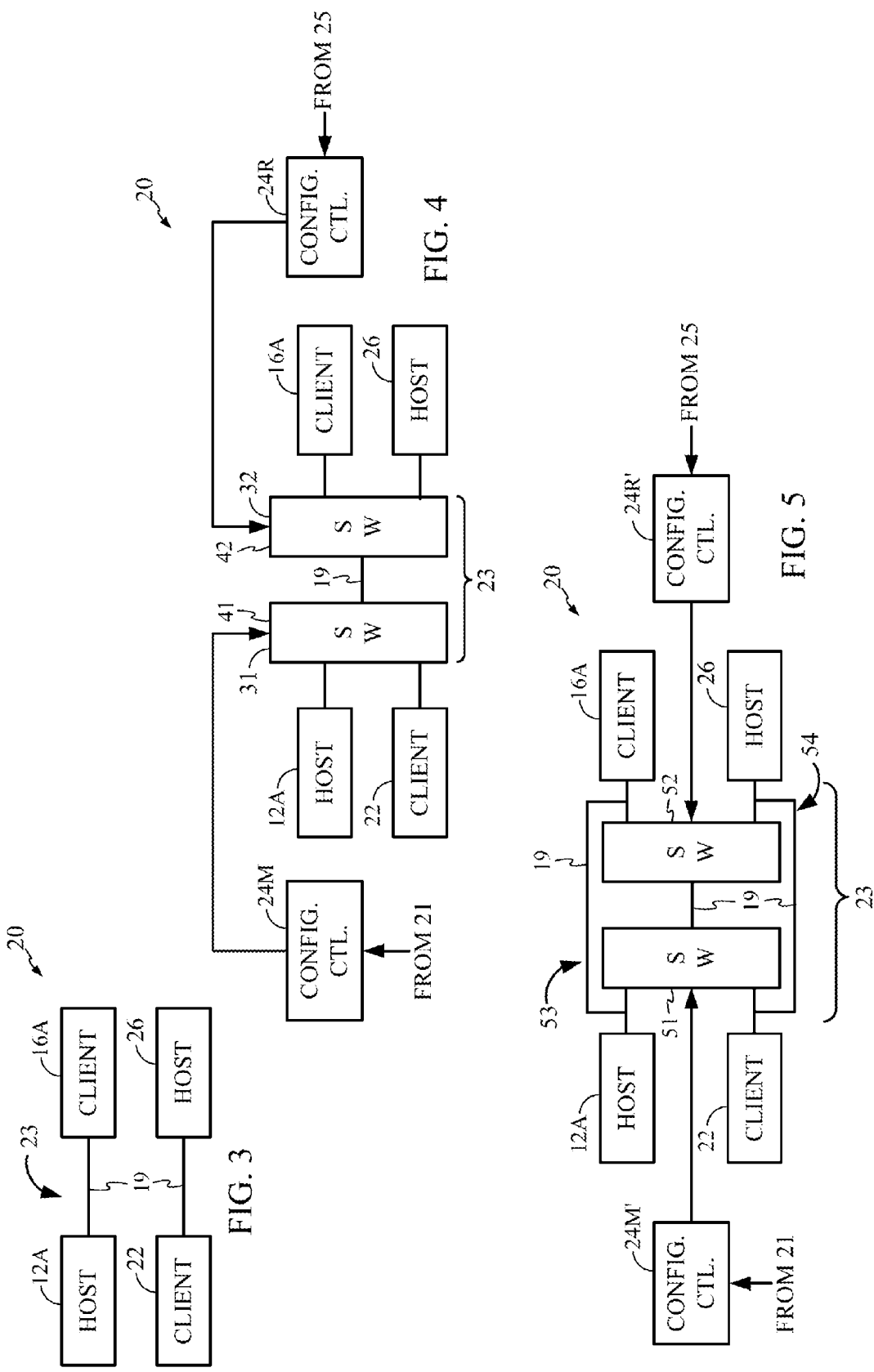

REMOTE MEMORY ACCESS USING REVERSIBLE HOST/CLIENT INTERFACE

BACKGROUND

1. Field

The present work relates generally to transferring data between two interconnected integrated circuit devices (chips) and, more particularly, to accessing memory on a first integrated circuit device from a second integrated circuit device.

2. Background

In some conventional data processing systems, a memory on a first integrated circuit device is accessed by a second integrated circuit device connected to the first device, whereby the second device may store data in the memory and retrieve data from the memory. In such an arrangement, the second device typically has a DMA-like connection to the memory on the first device. Some conventional architectures use a PCI-Express interface to implement this connection. However, the size and power requirements of that interface are not particularly suited to some (e.g., handheld) applications.

Other conventional interfaces, such as Secure Data I/O (SDIO), have relatively small size and power requirements, and are capable of providing a DMA-like connection to memory on the first device. Disadvantageously, however, the process of implementing the memory connection via such interfaces is often complicated and time-intensive.

With ever-increasing demands for improved data processing throughput, it is desirable to provide for increased efficiency in implementing the desired connection to memory.

SUMMARY

Accessing memory on a first integrated circuit device from a second integrated circuit device is supported by reversible host/client interfacing between the devices. The reversible interfacing permits the first and second devices to be configured respectively as host and client, or respectively as client and host.

BRIEF DESCRIPTION OF THE DRAWINGS

Various aspects of a wireless communications system are illustrated by way of example, and not by way of limitation, in the accompanying drawings, wherein:

FIGS. 3-5 diagrammatically illustrate the enhanced host/client interface of FIG. 2 according to various exemplary embodiments of the present work.

DETAILED DESCRIPTION

The detailed description set forth below in connection with the appended drawings is intended as a description of various embodiments of the present work and is not intended to represent the only embodiments in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work.

The word "exemplary" is used herein to mean "serving as an example, instance, or illustration." Any embodiment described herein as "exemplary" is not necessarily to be construed as preferred or advantageous over other embodiments.

Figure 1:
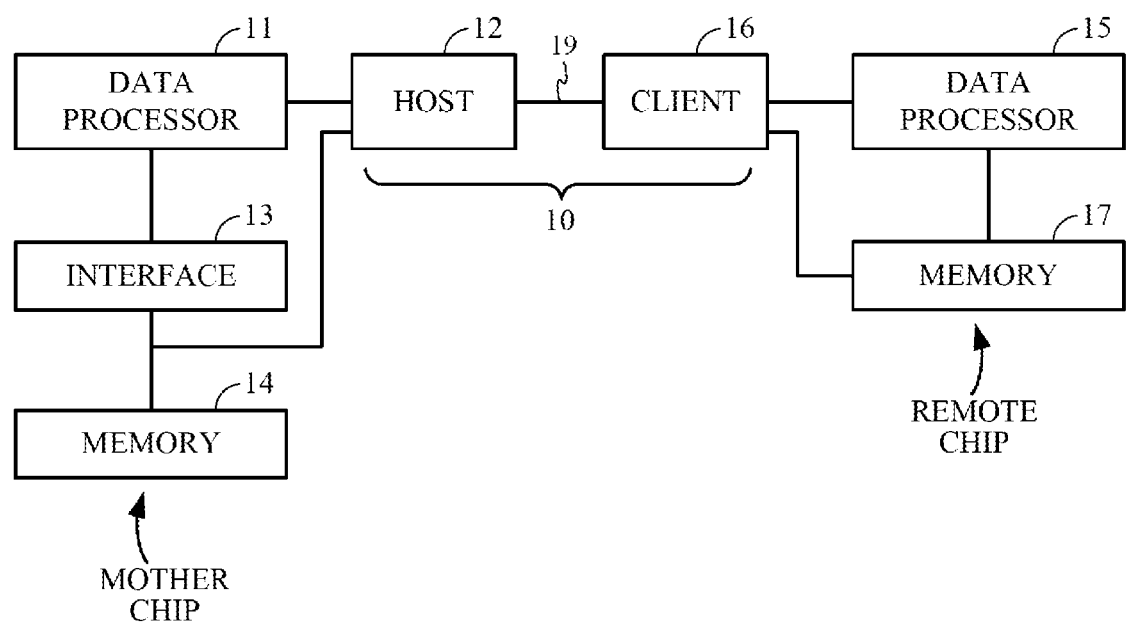
FIG. 1 diagrammatically illustrates a data processing system according to the prior art.

FIG. 1 diagrammatically illustrates a data processing system according to the prior art, including a remote data processing chip and a mother chip with data storage capability. The mother chip includes a data processor 11 coupled to a memory 14 via an interface 13. The remote chip includes a data processor 15 coupled to a local memory 17. The data processors 11 and 15 are interfaced to one another by a host/client-type interface designated generally at 10. The interface 10 includes a host 12 on the mother chip, a client 16 on the remote chip, and a connection 19 between the host 12 and client 16. The connection 19 includes connections between terminals of the mother chip and respective terminals of the remote chip. The terminal connections shown generally at 19 pass data and control signals between the host 12 and client 16. Various systems use various numbers and combinations of terminal connections in order to pass various numbers and combinations of control and data signals between host 12 and client 16. The connections and associated control and data signaling at 19 may be implemented, for example, according to the SDIO specification and protocol, wherein the control signals are command (referred to as CMD in SDIO) and clock (referred to as CLK in SDIO) signals.

The data processor 15 of the remote chip may access the memory 14 of the mother chip via the interface 10. This access requires the client 16 to signal the host 12, whereupon the host 12 initiates a process wherein the data processor 11 uses the interface 13 to set up the desired DMA connection, from the memory 14 to the remote chip via the host/client interface 10. This process is typically complicated and time-intensive. For example, execution of this process in an SDIO-based system requires the host 12 to interrupt its own operation, probe the client 16, and interrupt the data processor 11 numerous times.

Figure 2:
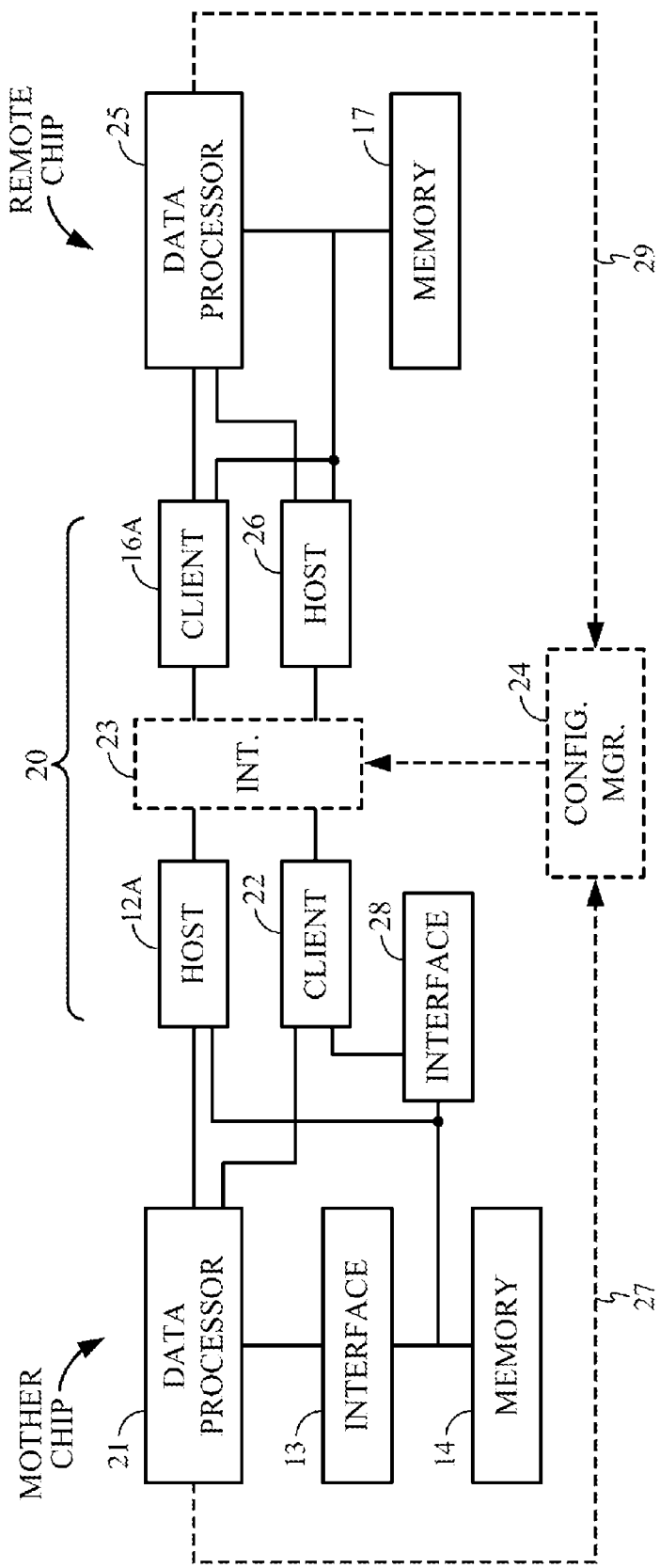
FIG. 2 diagrammatically illustrates a data processing system according to exemplary embodiments of the present work.

FIG. 2 diagrammatically illustrates a data processing system according to exemplary embodiments of the present work. The system of FIG. 2 implements an enhanced host/client interface 20 between a data processor 21 in a mother chip and a data processor 25 in a remote chip. Examples of the mother chip include integrated circuit devices used to implement personal computers, digital cameras, mobile phones, etc. Examples of the remote chip include integrated circuit devices used to implement modems (e.g., wireless LAN or WinMax modems), graphics processors, mobile phones, etc. Thus, in various embodiments, the data processing system of FIG. 2 may constitute: a fixed site apparatus (e.g., a desk top computer); a portable apparatus (e.g., a lap top computer, or a hand held computer, mobile telephone, etc.); a fixed site apparatus connected to a portable apparatus; or a first portable apparatus connected to a second portable apparatus.

The enhanced host/client interface 20 includes a host 12A on the mother chip and a corresponding client 16A on the remote chip, as well as a host 26 on the remote chip and a corresponding client 22 on the mother chip. An interface 23 routes signals between the host 12A and the client 16A, and between the host 26 and the client 22. In some embodiments, the interface 23 uses some or all of the same mother chip and remote chip terminals used by the interface 10 in FIG. 1 (not explicitly shown in FIG. 2). Some embodiments use a configuration manager 24 to configure the interface 23 in response to configuration control instructions 27 and 29, which are respectively provided by the data processors 21 and 25.

In some embodiments, the interface 20 may provide a host/client interface between the data processors 21 and 25, wherein the host 12A and client 16A interact in generally the same fashion as the conventional host 12 and client 16 in FIG. 1. However, when the data processor 25 needs to access the memory 14, the client 16A informs the host 12A, which in turn informs (e.g., interrupts) the data processor 21. The data processor 21, and the data processor 25 take action (e.g., instructing the configuration manager 24 at 27 and 29) to reconfigure the interface 20 to provide an alternate host/client interface via the host 26 of the remote chip and the client 22 of the mother chip. This alternate host/client interface reverses the host/client relationship between the two chips, which permits the data processor 25 to access and utilize an interface 28 (coupled between client 22 and memory 14) on the mother chip to set up the desired DMA connection, including a data path between the memory 14 and the remote chip. This data path includes the interface 28, the client 22 and the host 26.

As compared to the prior art memory access of FIG. 1, the memory access achieved in the system of FIG. 2 achieves higher data rates, reduced latencies, and reduced loading on the mother chip data processor 21 (because it need not be interrupted as often to service requests). In SDIO-based embodiments, the interface 28 may be implemented using an AHM master interface and a corresponding master port on the UMDX arbiter.

FIG. 3 diagrammatically illustrates the enhanced host/client interface 20 according to exemplary embodiments of the present work. In FIG. 3, respective sets of control and data signals are apportioned to the host 12A/client 16A connection and to the host 26/client 22 connection. For example, in an SDIO-based architecture, the terminals of the mother chip and remote chip of FIG. 1 conventionally provide eight SDIO data lines and four SDIO control lines. Some embodiments apportion four of the SDIO data lines and two of the SDIO control lines (SDIO CLK and CMD lines) to each of the host/client connections of FIG. 3. Thus, in such embodiments, the terminal connections within the interface 23 of FIG. 2 are implemented by simple connection of four data lines and two control lines between each host/client pair in FIG. 3. In some SDIO-based embodiments, internal mother chip connections between mother chip terminals and the host 12A and client 22 may be accomplished by suitably configuring an I/0 switching unit that is conventionally available in an SDIO-based mother chip. This conventionally available I/0 switching unit is sometimes referred to as the TLMM unit. Some SDIO-based embodiments use the configuration manager 24 to configure the TLMM unit.

FIG. 4 diagrammatically illustrates the enhanced host/client interface 20 according to further exemplary embodiments of the present work. In FIG. 4, the configuration manager 24 of FIG. 2 is distributed between the mother chip and the remote chip in the form of configuration controllers 24M and 24R, respectively, and the interface 23 is similarly distributed in the form of switching units 41 and 42. In response to instructions from the data processors 21 and 25, the respective configuration controllers 24M and 24R configure the respective switching units 41 and 42 appropriately to provide desired connections within the interface 23. In some SDIO-based embodiments, the switching units 41 and 42 selectively switch up to ten SDIO lines (up to eight data lines, plus CMD and CLK) into connection between host 12A and client 16A, or between host 26 and client 22. In some SDIO-based embodiments, the switching unit 41 is implemented using the TLMM unit available on the SDIO-based mother chip.

FIG. 5 diagrammatically illustrates the enhanced host/client interface 20 according to further exemplary embodiments of the present work. In FIG. 5, the configuration manager 24 of FIG. 2 is distributed between the mother chip and the remote chip in the form of configuration controllers 24M' and 24R', and the interface 23 is similarly distributed in the form of switching units 51 and 52. In response to instructions from the data processors 21 and 24, the respective configuration controllers 24M' and 24R' configure the respective switching units 51 and 52 appropriately to provide desired connections within the interface 23. The switching units 51 and 52 selectively switch data signals (e.g., up to eight SDIO data lines in an SDIO-based architecture) into connection between host 12A and client 16A, or between host 26 and client 22. Further in FIG. 5, the interface 23 provides dedicated control line connections (shown at 53 and 54) for each of the host/client pairs. In some SDIO-based embodiments, each of the dedicated connections at 53 and 54 carries an SDIO CLK signal and an SDIO CMD signal. In some SDIO-based embodiments, the switching unit 51 is implemented using the TLMM unit available on the SDIO-based mother chip.

Figure 6:
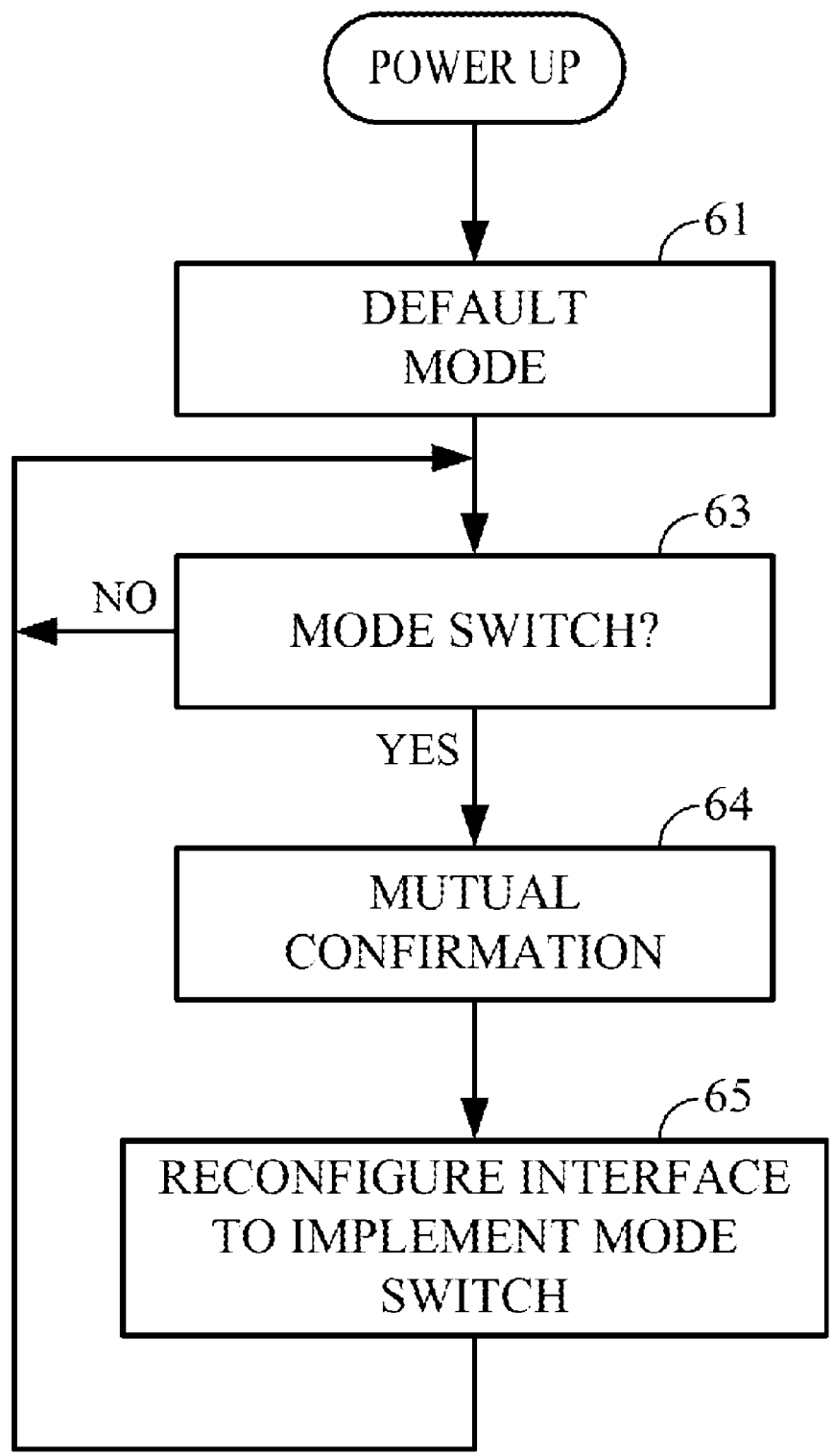
FIGS. 6 and 7 illustrate operations performed according to exemplary embodiments of the present work.
Figure 7:
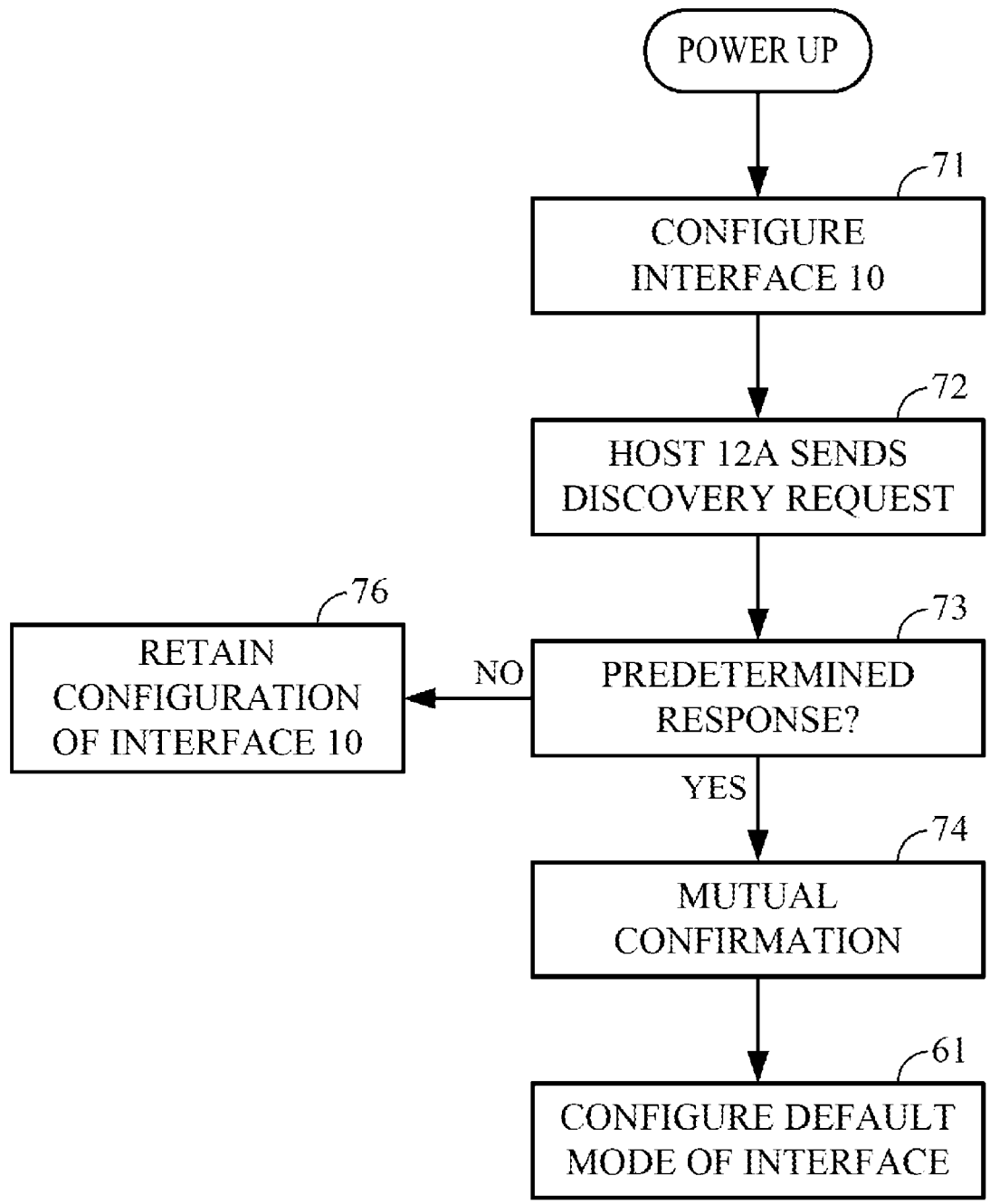

FIGS. 6 and 7 illustrate operations that may be performed according to exemplary embodiments of the present work. In some embodiments, the data processing systems illustrated by FIGS. 2-5 are capable of performing the operations shown in FIGS. 6 and 7. Referring also to FIG. 2, in some embodiments, the data processing system powers up with the enhanced host/client interface 20 initially configured for communication between host 12A and client 16A. The system continues to operate in this initial power up default mode (shown generally at 61) until the mother chip or the remote chip initiates a mode switch at 63. In some embodiments, while the interface 20 is still in the initial power up default mode 61, the host 12A may download to the client 16A any code that the remote chip may need, for example, code that enables the remote chip to support the enhanced host/client interface 20. After a mode switch is proposed (by either the host 12A or the client 16A) at 63, both the host 12A and client 16A confirm to one another at 64 their mutual agreement to the proposed mode switch. Then, at 65, the interface 20 is reconfigured according to the mutually confirmed mode change, thus leaving the interface 20 configured for communication between host 26 and client 22, after which the next mode switch proposal is awaited at 63. When a mode switch is next proposed at 63, and mutually confirmed at 64 by host 26 and client 22 (which together now constitute the active host/client pair in the interface 20), the resulting reconfiguration at 65 places host 12A and client 16A back in communication with one another as the active host/client pair. (This may be useful, for example, for downloading additional code to the remote chip, or for timely delivery of urgent messages to the remote chip.) Each successive mode switch proceeds analogously to those described above.

Some embodiments permit the mother chip of FIG. 2 to operate also with a legacy remote chip such as the prior art remote chip of FIG. 1. As shown at 71 in FIG. 7, such embodiments power up with the interface 20 initially configured so that the terminal connections between the remote chip and the host 12A on the mother chip are the same as, and carry the same signaling (e.g., the same SDIO signals) as, the terminal connections between the FIG. 1 remote chip and the host 12 on the FIG. 1 mother chip. In other words, the host/client interface 10 of FIG. 1 is initially provided. A discovery procedure is then used to discover whether the remote chip supports the enhanced host/client interface 20 of FIG. 2. In this discovery procedure, as shown at 72, the host 12A sends a predetermined discovery request to the connected client on the remote chip. If the connected client is a client 16A, it will provide a predetermined response to the discovery request, thereby indicating to the host 12A that it supports the enhanced host/client interface 20. If the connected client is a client 16 of a legacy remote chip, it will fail to provide the predetermined response.

If the host 12A receives the predetermined response at 73, then the host 12A and the client 16A confirm to one another at 74 that the configuration of the interface 23 will be modified, after which the interface 23 is reconfigured such that the overall enhanced host/client interface 20 assumes the same initial power up default mode configuration described above relative to FIG. 6 and shown at 61. From this point, operation proceeds as in FIG. 6. On the other hand, if host 12A does not receive the predetermined response at 73 in FIG. 7, the initial interface configuration (see also 71) is retained at 76, so the host 12A remains interfaced to the client 16 in the same manner as the host 12 of FIG. 1 would be, thereby permitting the mother chip of FIG. 2 to operate with the remote chip of FIG. 1.

In various embodiments, the interface 20 is configured to support various throughput requirements, latency requirements, and combinations thereof. Some embodiments provide the client 22 with a security mechanism to protect the memory 14 against unauthorized access.

In the instances described above wherein the active host and the active client confirm to one another that the interface configuration is to be changed, they may utilize any suitable handshaking or negotiation procedure to reach their mutual agreement. Many such procedures are known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:

1. A data processing apparatus, comprising:
a host on a first integrated circuit, a first data processor on said first integrated circuit coupled to said host, and a memory on said first integrated circuit;
a client on a second integrated circuit, and a second data processor on said second integrated circuit coupled to said client, said client connectable to said host for cooperation therewith to interface between said first and second data processors, wherein said host is configured to provide an interrupt to said first data processor in response to input from said client;
a host on said second integrated circuit coupled to said second data processor, and a client on said first integrated circuit coupled to said memory; and
a connection structure configured to permit a connection between said client on said first integrated circuit and said host on said second integrated circuit to provide a data path between said second data processor and said memory, said connection structure coupled to said first data processor for permitting said connection in response to a signal produced by said first data processor in response to said interrupt.

2. The apparatus of claim 1, wherein said connection structure includes a switching unit on said first integrated circuit for permitting connection of said host on said first integrated circuit to said client on said second integrated circuit and connection of said client on said first integrated circuit to said host on said second integrated circuit.

3. The apparatus of claim 2, including a further switching unit on said second integrated circuit for cooperation with said first-mentioned switching unit to connect said host on said first integrated circuit to said client on said second integrated circuit and to connect said client on said first integrated circuit to said host on said second integrated circuit.

4. The apparatus of claim 1, including a switching unit on said second integrated circuit for permitting connection of said host on said second integrated circuit to said client on said first integrated circuit and connection of said client on said second integrated circuit to said host on said first integrated circuit.

5. The apparatus of claim 1, wherein each said host communicates with the corresponding client in accordance with SDIO protocol.

6. The apparatus of claim 1, including a memory access interface on said first integrated circuit for interfacing said memory to said client on said first integrated circuit.

7. An interface method, comprising:
interfacing between first and second data processors respectively provided on first and second integrated circuits, including connecting a client on the second integrated circuit to a host on the first integrated circuit that is permitted to provide an interrupt to the first data processor in response to input from the client; and
providing a data path between the second data processor and a memory on the first integrated circuit, including connecting a client on the first integrated circuit to a host on the second integrated circuit in response to a signal that the first data processor produces in response to said interrupt.

8. The method of claim 7, including performing said interfacing before said providing, and thereafter performing said providing instead of said interfacing.

9. The method of claim 7, wherein said interfacing includes negotiating between the host-configured first integrated circuit and the client-configured second integrated circuit for agreement to perform said providing.

10. The method of claim 7, wherein said interfacing includes discovering that the second integrated circuit supports said configuring.

11. An interface apparatus, comprising:
means for interfacing between first and second data processors respectively provided on first and second integrated circuits, including means for connecting a client on the second integrated circuit to a host on the first integrated circuit that is permitted to provide an interrupt to the first data processor in response to input from the client; and
means for providing a data path between the second data processor and a memory on the first integrated circuit, including means for connecting a client on the first integrated circuit to a host on the second integrated circuit in response to a signal that the first data processor produces in response to said interrupt.

12. An integrated circuit apparatus, comprising:
a data processor and a client coupled to said data processor and configured for communication with a corresponding host on another integrated circuit apparatus to interface said data processor to another data processor on said another integrated circuit apparatus, wherein the corresponding host is permitted to provide an interrupt to said another data processor in response to input from said client; and
a host coupled to said data processor and configured for communication with a corresponding client on said another integrated circuit apparatus to provide a data path between said data processor and a memory on said another integrated circuit apparatus, wherein said communication with the corresponding client occurs in response to said interrupt.

13. An integrated circuit apparatus, comprising:
a data processor and a host coupled to said data processor and configured for communication with a corresponding client on another integrated circuit apparatus to interface said data processor to another data processor on said another integrated circuit apparatus, wherein said host is configured to provide an interrupt to said data processor in response to input from the corresponding client on said another integrated circuit apparatus;
a memory;
a client coupled to said memory; and
a connection structure configured to permit a connection between said client and a corresponding host on said another integrated circuit apparatus to provide a data path between said memory and said another data processor, said connection structure coupled to said data processor for permitting said connection in response to a signal produced by said data processor in response to said interrupt.

14. The apparatus of claim 13, including a memory access interface coupled between said client and said memory.

15. A computer program product for providing interfacing, comprising:
a computer-readable medium comprising:
code for causing at least one data processor to interface between first and second data processors respectively provided on first and second integrated circuits, including connecting a client on the second integrated circuit to a host on the first integrated circuit that is permitted to provide an interrupt to the first data processor in response to input from the client; and
code for causing the at least one data processor to provide a data path between the second data processor and a memory on the first integrated circuit, including connecting a client on the first integrated circuit to a host on the second integrated circuit in response to a signal that the first data processor produces in response to said interrupt.

* * * * *